(12) United States Patent
Billington et al.

(10) Patent No.: US 6,944,689 B2
(45) Date of Patent: Sep. 13, 2005

(54) PRINTER/POWERED PERIPHERAL NODE SYSTEM

(75) Inventors: Corey Billington, San Jose, CA (US); Chris Bradley, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 10/633,465

(22) Filed: Jul. 31, 2003

(65) Prior Publication Data

US 2004/0024932 A1 Feb. 5, 2004

Related U.S. Application Data

(63) Continuation-in-part of application No. 09/907,212, filed on Jul. 16, 2001.

(51) Int. Cl.⁷ .............................................. G06F 13/14
(52) U.S. Cl. ......................... 710/62; 347/198; 358/498; 358/474
(58) Field of Search .......................... 710/62; 347/198; 358/498, 474

(56) References Cited

U.S. PATENT DOCUMENTS

| | | | |
|---|---|---|---|
| 5,099,346 A | | 3/1992 | Lee et al. |
| 5,247,380 A | | 9/1993 | Lee et al. |
| 5,421,012 A | | 5/1995 | Khoyi et al. |
| 5,485,458 A | * | 1/1996 | Oprescu et al. ............ 370/85.2 |
| 5,596,723 A | | 1/1997 | Romohr |
| 5,945,981 A | | 8/1999 | Paull et al. |
| 5,968,147 A | | 10/1999 | Polfer et al. |
| 6,052,380 A | | 4/2000 | Bell |
| 6,081,356 A | | 6/2000 | Branc et al. |
| 6,147,682 A | * | 11/2000 | Kim ............................ 345/211 |
| 6,160,642 A | * | 12/2000 | Mui et al. .................... 358/498 |
| 6,185,010 B1 | * | 2/2001 | Watanabe .................... 358/474 |
| 6,252,614 B1 | | 6/2001 | Mullin |
| 6,255,800 B1 | | 7/2001 | Bork |
| 6,304,250 B1 | | 10/2001 | Yang et al. |
| 6,327,613 B1 | | 12/2001 | Goshey et al. |
| 6,328,612 B1 | * | 12/2001 | Chung ........................ 439/717 |
| 6,373,511 B1 | * | 4/2002 | Groves et al. .............. 347/198 |
| 6,462,839 B1 | * | 10/2002 | Short .......................... 358/474 |
| 6,473,783 B2 | | 10/2002 | Goshey et al. |
| 6,476,795 B1 | | 11/2002 | Derocher et al. |
| 6,791,605 B1 | * | 9/2004 | Reele et al. ........... 348/207.99 |
| 2001/0016889 A1 | | 8/2001 | Kikinis |
| 2002/0029311 A1 | | 3/2002 | Joyeau et al. |
| 2002/0031099 A1 | | 3/2002 | Cookman et al. |
| 2002/0042851 A1 | | 4/2002 | Lochner et al. |
| 2002/0054321 A1 | | 5/2002 | Kikuchi |
| 2002/0077067 A1 | | 6/2002 | Lochner et al. |
| 2002/0085361 A1 | | 7/2002 | Wachel |
| 2002/0091826 A1 | | 7/2002 | Comeau et al. |
| 2002/0138548 A1 | | 9/2002 | Neebe et al. |
| 2002/0194180 A1 | | 12/2002 | Alsop et al. |
| 2003/0005186 A1 | | 1/2003 | Gough |

* cited by examiner

Primary Examiner—A. Elamin

(57) ABSTRACT

A printer/powered peripheral node system, wherein a printer and at least one other peripheral device connectable thereto share a footprint and a power supply and a data bus connection, whereby one or more additional peripheral devices can be located at the location of the printer.

39 Claims, 4 Drawing Sheets

PRINTER/POWERED PERIPHERAL NODE SYSTEM

This application is a Continuation-in-Part of U.S. patent application Ser. No. 09/907,212 filed Jul. 16, 2001, the disclosure of which is incorporated herein by reference for the relevant teachings consistent herewith.

BACKGROUND

The invention relates to information systems. More particularly, the invention relates to peripheral devices, and their integration with other peripherals, computers, such as personal computers (PCs), etc., in a stand-alone or network environment, to provide cost and space efficiencies.

As an aside, by "peripheral" or "peripheral device" as used herein, what is meant is essentially any device that (1) requires power, and (2) can be in data communication with a processor. Thus, a relatively "dumb" device (even minimal hardware) requiring a supply voltage and configured for data communicating with a processor, will meet this definition. This is in addition to devices more conventionally thought of as peripherals, such as printers, scanners, data storage and retrieval devices, etc. For example, wired and wireless data links, also requiring a supply voltage and transferring data, will be for purposes of this disclosure included in the definition of "peripheral device" and/or "peripheral" (and plural forms) unless from the context it is clear to one skilled in the art that this is not intended in a specific instance.

Typically, consumers and companies purchasing peripherals do so in one of four ways. First, peripherals can be purchased bundled with a personal computer or PC workstation. Second, they can purchase peripherals as add-ons to insert in an empty bay (slot) in a PC. Third, they can purchase peripherals as stand-alone units to attach to the PC externally, for example via a data connection using a standardized protocol, such as a serial port, parallel port, USB port, FireWire port, or the like, to connect with the processor via the peripheral connection interface (PCI) or other data bus type implicated. And forth, in a networked environment, a stand-alone peripheral can be purchased and connected to the network, and can be shared among a plurality of users. This is very common with printers, for example. Typically, this forth way requires a network node be established, as discussed below, with an address for the peripheral device on the network.

With the first option, there are usually cost advantages to buying the peripheral(s) bundled with the PC, as they come as part of a "package deal." However, often a purchasing individual or company cannot predict whether there will be a need for a particular peripheral at a particular PC or workstation, and cannot determine whether the purchase is justified from a cost/benefit standpoint. Also, often the particular peripherals, or their capabilities as bundled, are not a matter of choice. That is, at a certain price point, the deal may be to take these PC(s), bundled with certain particular peripherals, or leave it. So, the purchaser may not have complete discretion in customizing the peripherals, or set of peripherals, bundled with the computer when cost is a major consideration. Moreover, all the bays in the case of the PC may be filled by peripheral devices included, and if the purchaser wants an additional peripheral, then a different arrangement will be needed in any event. For example, a peripheral bundled with the PC can be removed and a preferred peripheral installed in its place.

This latter arrangement is somewhat similar to the second option mentioned above; that is, purchasing a PC with at least one empty bay; and, purchasing another peripheral separately and installing it in the empty bay. This second option is workable only if an empty bay is available (which may mean discarding a bundled peripheral, as mentioned). Furthermore, this option has the inherent potential of increased cost, both of the actual installation, and of the possibility of error in installation, causing other problems with resulting costs of repair or replacement. In a large enterprise particularly, where a single problem can be repeated many times, this can lead to higher costs.

The third option is not without drawbacks either. The primary disadvantage of buying external stand-alone peripherals is cost. The devices are typically more expensive, as they each typically need to have their own power supply. Additional connectors and cables are also required. Furthermore, the extra space for the external peripheral has an associated cost as well; as the desktop space could otherwise be put to another productive use besides providing a footprint for a single external peripheral. Moreover, inherent in this third option is the inconvenience of having to connect the external device, resolve any compatibility problems, and the incremental cable management problem associated with connecting yet another device at a P.C./workstation. These difficulties militate against this option.

In the fourth way of providing peripherals mentioned above, sharing them across a network, a network node is typically established so that the peripheral can have a network address. To do this, typically a network-enabled peripheral is purchased (at extra cost) which includes a local area network (LAN) card, or other logic, to establish the node on the network so that a data connection for the device can be established with network users. Another solution is to purchase a network connection device which includes the LAN card or other hardware to implement the data communication logic, and this device is connected between the peripheral and the network to establish the node. This is very common in the case of shared printers on networks, for example.

One conventional solution to the problem of providing shared peripherals in a network environment is to connect a PC to a network, and install/connect the shared peripherals to this PC. This PC establishes a node for the peripherals, so they can be addressed and accessed by users on the network, as well as a power supply for the peripherals. It can be typical that such a PC is not used other than to host/support the peripherals. This is due to inherent distractions in a workspace at the location of a PC hosting the shared peripherals. If in a private space, the coming and going of other users can be distracting to a user. If in a common area, the noise and distractions at a typical common area of the workspace, convenient to users, and not at all private, will typically be a problem for someone trying to concentrate using the PC on work there. These are two examples of why such a PC at the node may not be efficiently used; or worse, may lead to inefficiency of a PC user in performing tasks.

As will be appreciated, each of the four typical ways to provide for connection of peripheral devices discussed above can be problematic. However, conventional solutions continue to be used for lack of a better arrangement.

SUMMARY

The inventors have recognized that alternative arrangements for providing for connection of peripheral devices may mitigate some of the problems set out above. They have developed another solution for connection of peripherals which can provide benefits heretofore unavailable.

The invention comprises providing a printer/powered peripheral node (P/PPN) system, comprising: a) a housing configured to house a printer and at least one additional peripheral device; b) a powered peripheral node (PPN) further comprising a data connection enabling data communication with the printer and the at least one additional peripheral device by a user, and a power supply configured to provide power to the printer and at least one additional peripheral device. Accordingly, at least one additional peripheral device can be located at a location of the printer, and share a power supply and data connection with the printer.

Further features and advantages will be apparent with reference to the following detailed description, taken together with the accompanying drawings, which together disclose several exemplary embodiments of the invention. More details concerning implementation of the invention, and benefits provided thereby, will be appreciated with study of these examples.

BRIEF DESCRIPTION OF THE DRAWING FIGURES

DETAILED DESCRIPTION OF EXEMPLARY EMBODIMENTS

Figure 2:
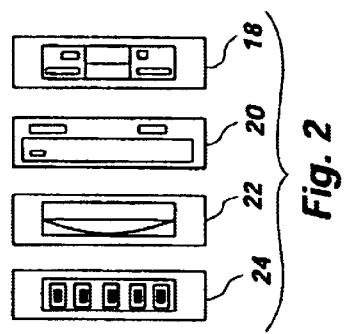
FIG. 2 is an elevation view of front faces of several examples of peripherals which can be incorporated in the embodiment illustrated in FIG. 1.
Figure 1:
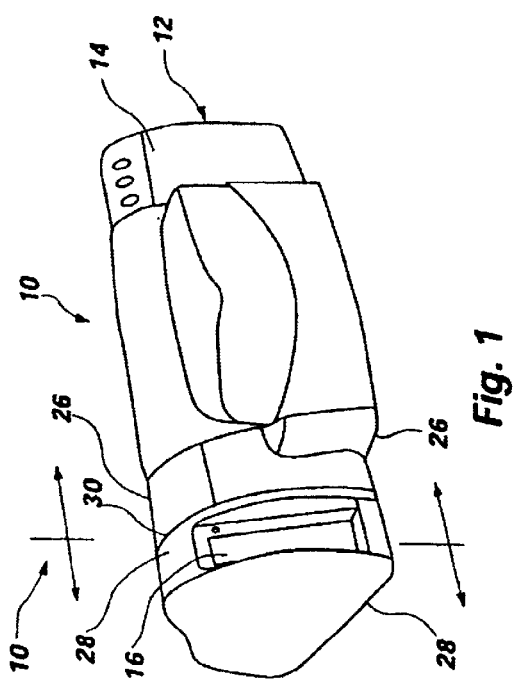
FIG. 1 is a perspective view of a P/PPN system according to an embodiment of the invention.

With reference to FIG. 1 of the drawings, which are given by way of example and not by way of limitation, a printer powered peripheral node (PPPN) system 10 which leverages the power supply and footprint of a printer 12, in one embodiment comprises a printer which further comprises a housing 14 which also houses an additional peripheral 16. For example only, the peripheral can be one of those shown in FIG. 2, namely a disk drive 18, a CD or CDR/W or DVD drive 20, a zip drive 22 and a data bus hub 24 using some protocol, such as USB, FireWire, etc.

Again with reference to FIG. 1, the housing can be configured with a unitary construction. In another embodiment, the housing can comprise two portions 26, 28 joined together at a separable, or (after joining) un-separable, joint 30. One portion, 26 houses the printer, and another portion 28, comprises a module that houses a peripheral. The joint can be made so as to be a permanent connection in one embodiment. That is to say, for example, that a module is joined at manufacture to the printer housing, to provide for easier bundling of peripherals of various types with the printer to be sold as a unit, but not afterward easily separated. Modules containing various peripherals are made, and then, in accordance with what combination is desired in a particular printer/peripheral bundle to be made, an appropriate module is selected and attached to the printer. For convenience, connections for power and data communication can be standardized. In one embodiment, the connection can be substantially modular and snap-together, with connectors for power and data comprising standardized connections at standardized locations in the respective housing portions 26, 28, to facilitate easy and rapid final assembly in bundling a peripheral of choice with a printer.

In one embodiment, the connection between the printer housing portion 26 and the peripheral module 28 can be a "snap-tight" connection, easy to connect, but difficult to disconnect. Such connections are well known, and can be implemented in one of a number of conventional ways. In another embodiment, where the modules are "snap tight" as just described, or are separable, the system 10 enables printers 12 and peripherals 16 to be packaged and sold separately. A consumer can choose the particular peripheral module desired to be combined with the printer (for example, one 6f the types shown in FIG. 2). This peripheral can be purchased separately. The consumer can then attach the selected peripheral by joining the peripheral module housing 28 to the printer housing 26, simultaneously making the power and data connections as previously described.

In another embodiment where the peripheral module 28 can be separable, it can subsequently be changed out for another module containing a different peripheral device to be connected to the PPPN. Thus the PPPN is re-configurable as the needs of users change. In another embodiment the snap-tight connection can be permanent. There the choice of peripheral, or a mix of peripherals, is set and cannot be interfered with. The latter may be advantageous in a large organization, where the former may be advantageous in a smaller organization, or in a workgroup within a larger organization.

In one embodiment, the connections for power and data can be standardized connectors, or one combined connector, (e.g. 46 in FIG. 4) having one portion carried by the printer housing portion 26, and one portion carried by the peripheral module portion 28. The positioning of the connector portions is such that they mate when the printer and peripheral housing portions are mated.

In one example embodiment, the configuration of the housings 26, 28, and/or the configuration of the power and data connector(s) can be made to act as a physical "key" so that only compatible devices are attachable. For example, if the printer 12 has a power supply that is configured to provide power at a predetermined voltage and current to the peripheral 16, connection of an incompatible peripheral designed for a different voltage and/or drawing a different current may damage the power supply, rendering the printer unusable as well as the incompatible peripheral. Or, vice versa, a peripheral might be damaged if connected to an incompatible printer power supply. Thus a physical key, acting to insure that only compatible devices are connected, can be useful to provide compatible devices with the particular physical configuration for connection of the housing portions 26 and 28, and/or configuring the power and data connector(s) so that only compatible devices will connect. More will be said concerning this below.

In another exemplary embodiment, an electronic "key" (implemented, for example in software or firmware) can be used. This key can will require the negotiation of a security routine after connection of a peripheral 16 to the PPN, here embodied in the printer housing portion 26, and before enabling operation. For example, the logic can be embodied in the printer 12, which can check such things as that the attached peripheral device is drawing power within acceptable parameters, and that the data connection is of the right type, and that the peripheral is otherwise compatible. If any parameter is found unacceptable, it can disable the connection before damage occurs. Likewise the key could simply be a query when the data connection is made, and a code key stored in the peripheral, which is supplied to the printer controller, and if a valid key sequence is passed, then data and power connections are enabled, otherwise, disabled. As will be appreciated, this later case can also be useful for ensuring that peripheral devices from an authorized manufacturer are connectable, an those made by an unauthorized manufacturer are not. That is to say, in a system 10 where it is desirable that only manufacturers who produce reliable and high quality products be licensed to supply, for example, peripheral modules 28, or printers 12, such a key can be used to prevent "knock-offs" of inferior quality and reliability to be used with system printers or peripheral modules.

Likewise, the peripheral 16 can be configured to determine that a power and data connection is compatible before allowing connection. Thus the electronic key can reside in either the peripheral device to be connected, or in a peripheral module 28 or other structure 26 housing the PPN, or the housing 14 typically associated with a printer 12 that the peripheral is to be connected to, or some combination thereof.

Figure 3:
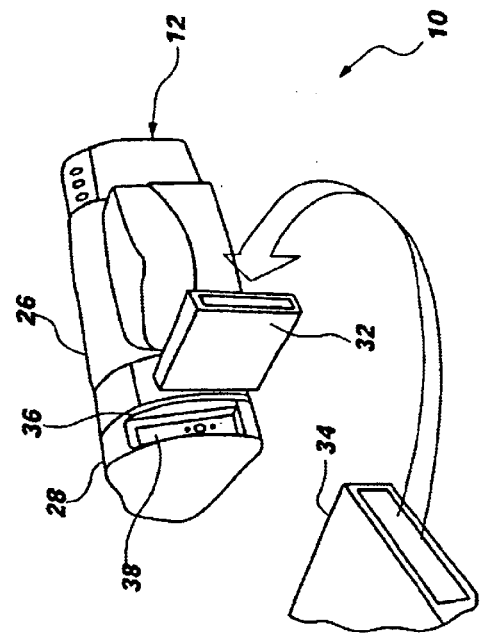
FIG. 3 is a perspective schematic illustration, partly in break-away, of a P/PPN system according to an embodiment of the invention, this embodiment accommodating a swappable peripheral device, in the illustrated embodiment a peripheral device being swappable between a laptop, shown only partly and in break-away, and a module attached to a printer case.

As will be appreciated with reference to FIG. 3, in one embodiment the system 10 can be confined to accommodate a swappable peripheral device 32, such as a swappable drive from a laptop 34 which can be inserted and removed from a bay 36 carried by the peripheral module 28. The bay can include a spring-biased door 38 that closes when the peripheral is removed. This arrangement allows compatible swappable peripheral devices to be used, including zip drives, hard drives, floppy drives, CD/CDR-W/DVD drives, memory devices, wireless communication devices, and others. A "key" (physical or electronic) as described above can be used with this embodiment as well.

Again with reference to FIG. 1, and as discussed above, the peripheral module 28 can be made to be removable by a user. It can be replaced by another module, for example one containing a different peripheral. Thus, in this sense the whole module can be "swappable" to change attached peripherals in one embodiment.

Figure 4:
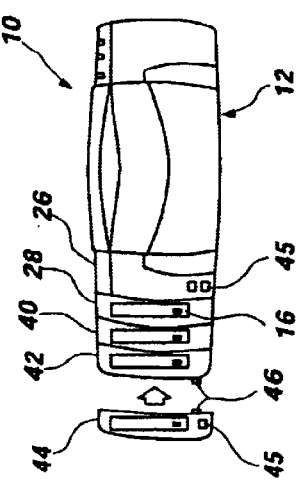
FIG. 4 is an elevation view, partly exploded, of a P/PPN system according to an embodiment of the invention, wherein a plurality of modules are configured for stackable connection to the printer; one module being shown disconnected but in a position to be connectable by bringing it to the right to snap onto a previously connected module.

With reference now to FIG. 4, in another embodiment the PPPN can be configured for accommodating multiple peripherals 16. A peripheral module 28 can be configured so that another module 40 can attach to it. In this way, a flexible modular implementation is enabled. By selecting desired peripheral modules, e.g. 28, 40, 42, 44, a collection of desired peripherals can be bundled with the printer and can be located at a printer location in use. The stacking of modules is contemplated in the illustrated embodiment, where each module is configured to both attach on to a printer and/or another module; and, to be attached to, and support, another module (or several) in turn attached to it. For example, in the illustrated embodiment, a printer 12 with three modules 28, 40, 42 attached can be configured to receive a fourth module 44 in a stacked configuration; and so on. A connector 46 with one of a male or female part shown on the module 44 being added, and a complementary part on module 42 receiving the new module, makes power and data connections. In another embodiment, the connector can simply comprise conductors, one set of which can be spring-biased, which are brought into contact as the modules are joined together. Other known connector schemes can be used. A removable cover (not shown) can be provided for one or both of the connector portion(s) of the respective modules. This cover can reduce the incidence of inadvertent contact of connector portions with people and things in the immediate vicinity.

As mentioned, the connector(s) 46 and connector locations (as well as case attachment means) can be standardized between the modules (e.g. 42, 44) to allow for stacking of modules in whichever order the user wants. The connections can be made to be permanent, or snap-tight (that is to say, releasable with difficulty), or fully and conveniently releasable, to allow for changing the peripheral modules attached. In the later case, the purpose of releasability is to allow the user or an assembler at the time of manufacture to change the types or locations of peripherals 16 in the stack. Also, while the connectors can be standardized for compatible modules, they also can be made unique to compatible devices, and thus act as a key to prevent incompatible peripherals from being connected, as discussed above.

In another embodiment an electronic key, as set forth above, can be used to prevent incompatible devices (say, for example the device in the module portion 44 was incompatible) from being connected (or, put another way, from being used to the point of detriment if connected). Even though connected through power and data connection connectors 46, if the "key" is not provided, passed, or satisfied (depending on particulars of the type of key) upon connection, then power to and data from a newly connected module can be disabled by logic located either on the printer 12 side or a connected module (e.g. 44) side of the connection, or both. Likewise, if a module is connected to an incompatible module or printer, the module itself can disable its own function while so connected, for example, to prevent damage.

Figure 5:
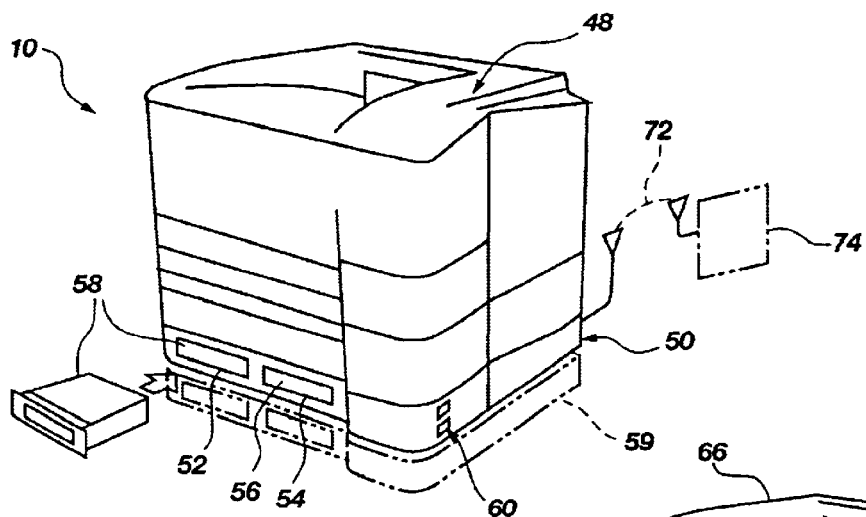
FIG. 5 is a perspective view, partially exploded, partially in outline, illustrating a P/PPN system according to an embodiment of the invention, one peripheral shown both installed in the module in outline, and also separate therefrom as it would be positioned just prior to being installed in a bay of the module.

In one embodiment, the peripherals can be allowed to function peer-to peer. For example such would be the case in printing directly from a camera data output connected via a data port in a USB hub 24 to a PPPN data-connected peripheral device. Image data passes directly to the printer 12 where it is converted to a printed image output. A printer and/or one or more of the modules 28, 40, 42, 44 described above in connection with FIGS. 1–4 can be provided with an extra data port 45, or a plurality of them. This would enable peer-to-peer data communication from another device as described, or uploading data to a data storage drive at the PPN, for example. It will also enable data to be sent to a client on a network via a wired or wireless network connection, for example. Also, a peripheral in a connected module can communicate with another connected peripheral, or the printer, in one embodiment. For example image data from a storage drive could be transferred to another memory or storage device, or printed, provided formatting is provided in the latter case Turning now to FIG. 5, in another embodiment the "side" of a printer 48 the peripheral module 50 can be attached to is the bottom side. The footprint of the printer is not increased in area by addition of one or more additional modules of like size. Otherwise, the modules can be as before described. In the illustrated embodiment the module has bays 52, 54 for two peripherals 56, 58. As just alluded to, the module can be stackable with another module 59 added underneath. More modules can be stacked to add additional peripherals. The module can also comprise one or more data bus connections, for example USB or FireWire ports, 60, for data connection of other peripherals. For example a PDA, a camera, or other device, can be connected, as mentioned above.

Figure 6:
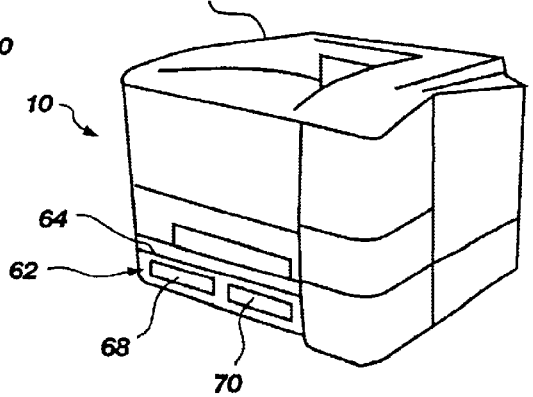
FIG. 6 is a perspective view of a P/PPN system according to an embodiment of the invention, wherein the module is fit in an auxiliary paper tray slot in a printer.
Figure 6A:
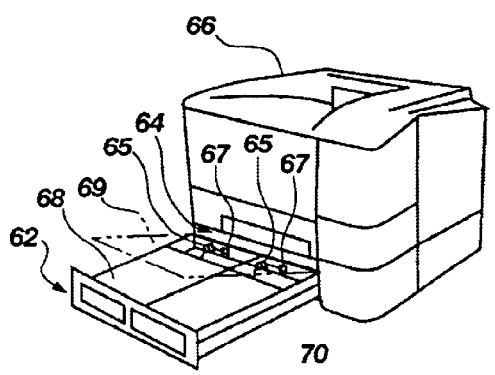
FIG. 6A is a perspective view, partially exploded, of the embodiment of FIG. 6, showing the module configured to fit interchangeably with an auxiliary paper tray; and being separately and positioned as it would be just prior to insertion into the printer case.

With reference now to FIGS. 6 and 6A, in another embodiment a peripheral module 62 and a printer 66 can be configured so that the module can be received in an auxiliary paper tray slot 64 of a printer 66. One or more peripherals 68, 70 can be carried by the module. Again, power and data connections can be provided so that the peripherals receive power and are connected to a data bus and/or network connection logic. This can be done in one embodiment by providing one or more connectors 67 which make contact when the module is fully inserted into the slot, thus to make the connections for power and data transfer to and from the peripherals. The peripherals can be conventionally connected (e.g. by connectors 65) within the module to the power and data connection connectors, and this can be facilitated by having an open top or openable top 69 as in the illustrated embodiment. In another embodiment, bays (as discussed above) can be provided in the module 62, and can be configured to receive conventional or swappable peripheral devices, as described above. In the latter case, the power and data connection is made when the peripheral device is fully inserted, similar to the connections made by inserting the module 62 into the auxiliary paper tray slot 64. That is to say, by making connector(s) connect when the module or peripheral is seated.

In one embodiment a module (28 in FIG. 1, 50 in FIG. 5, and 62 in FIG. 6) or a connected printer (12, 48, 66 in the various figures) can further comprise a wireless data connection 72. This wireless connection can enable the printer as well as connected peripherals (e.g. a data drive, say 18 in FIG. 2), to be connected to a host 74 comprising a PC or network, via the wireless connection provided. For example, a low power transponder can be provided at the module, and another transponder connected to a PC or a network node or server, and this wireless connection can be shared by the printer and other connected peripherals at the PPPN. Here it should be noted that, as mentioned, the wireless connection can itself be defined as a peripheral device carried by the printer case, or a module attachable to the printer case or another peripheral module. The wireless connection "peripheral" can be powered by the shared power supply, and can be in data communication with the printer and other connected peripherals at the PPPN and the host PC or network 74. The wireless connection device simply extends access to the bus (or buses) accessible by the peripherals but without a hard-wired connection. At the time of filing of this application some bus types can be limited to a hard wire connection (and some not to exceed a prescribed length), but it is reasonably assumed that such a limitation will be overcome, and high speed data transfer by one or another standard bus type/protocol will be available over a wireless connection as contemplated above. Current wireless devices that can be used include WiFi and Bluetooth protocol devices and these are commercially available. Wireless USB drivers may soon be commercially available. In a case a network, in one embodiment the printer case or the module can carry a network card or other data connection logic hardware (not shown), as required, to facilitate the printer/peripheral unit functioning as a network node. The printer and peripheral(s) at the PPPN thus established are accessible to clients on the network. This connection to the network can be wired or wireless.

In one embodiment, there can also be a "translation" which occurs between the "network card" (or other data connection logic) and a shared data bus to which the printer (12, 48 or 66) and attached peripherals (e.g. 68, 70, in FIG. 6) are connected. That is to say, different protocols can be used. If that is the case, they will need to be made a working conduit for data by translation logic. For example, the data bus can be one of the many standard types, such as USB, FireWire, SCSII, etc. in one embodiment. The data connection to the network or PC host 74, can be one of the many standards, such as Ethernet, WiFi, Bluetooth, TCP/IP, etc. Systems for translation between standard protocols are known. Moreover, if the protocol for the bus or the connection to the network or PC is non-standard, it is known how to provide for translation to and from standard protocols; as this is generally required in most non-standard data connection schemes. In sum, communication using standard protocols is typically contemplated, though others can be used.

In another embodiment, each peripheral (e.g. 68, 70 in FIG. 6) can have its own data communication logic hardware. The data connection between the printer (e.g. 66 in FIG. 6) and the peripheral(s) in the module(s) 62 simply connects the "wires." Many different communication schemes can be used, and many different protocols. Whether it is a USB, FireWire, Serial, Parallel, Ethernet, TCP/IP or other scheme for data communication between devices and one or more connected users, the system 10 works in essentially the same way, though the particulars of the data communication methodology can vary widely. The point is that data communication to, and/or from, connected peripheral devices be provided for; and, convenient connection at the location of a printer be provided. This can be implemented in a number of ways as will be understood by persons skilled in the art. This includes, but is not limited to, the examples set forth herein.

Figure 7:
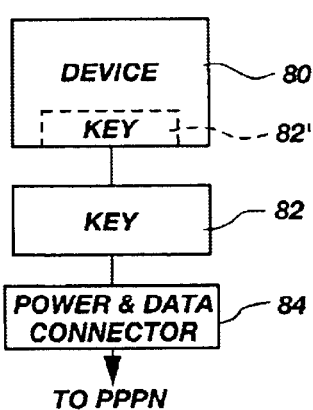
FIG. 7 is a schematic block diagram illustrating use of an electronic key in a P/PPN system according to an embodiment of the invention.
Figure 7A:
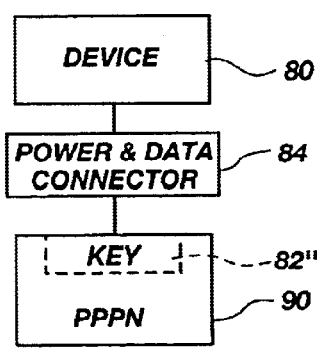

With reference to FIG. 7, the "key" concept discussed above is illustrated further. In one embodiment a device 80 to be connected to the printer or other module(s)(not shown) of the PPPN includes an electronic key 82 which can be an embedded system (software or hardware or a combination) detected by a data connection logic device (not shown), before a full connection is enabled, e.g. via a power and data connector 84 connecting to the printer's data and power connections (not shown) as described above. As mentioned, in one embodiment the key can be a device that acts as a switch, enabling connection only if it detects a compatible power supply, for example, from the device side of the connection. In one embodiment the key 82' can be incorporated entirely in the device 80, and in one embodiment can be primarily implemented in software. In another embodiment it is implemented in firmware, and in another embodiment can be a separate device within the case of the device 80 or attached between the device and the printer. In the later embodiment, it can further comprise a power conversion power supply (not shown) and can incorporate a data translator, to enable connection of an otherwise incompatible device to the printer having peripheral support capability. With reference to FIG. 7a, in another embodiment the key 82" can be embodied in the PPPN 90, for example in firmware associated with the printer controller, or as a separate devise within the PPPN case, as discussed above. Whether on the device side, or the module/printer (PPPN) side of the connection; and, whether implemented in software, firmware, etc. as mentioned above, an electronic key is configured to allow or disallow connection, or functioning of a peripheral device based on some criteria. That criteria can simply be that the power supply is compatible, or can be that the protocol is also compatible, or that a code sequence of a correct type is passed as well. Some of all of the foregoing can be used, and are set forth here as examples.

Figure 8:
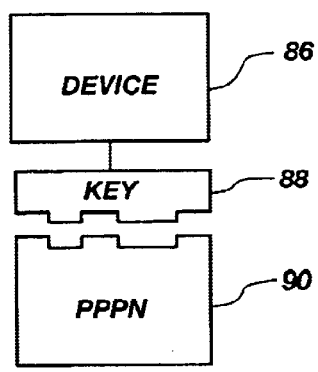
FIG. 8 is a schematic block diagram illustrating use of a physical key in a P/PPN system according to an embodiment of the invention.

With reference to FIG. 8, in another embodiment a peripheral device 86 can have a physical key 88, which allows connection to the printer having peripheral support capability 90. In this embodiment it is the compatibility of the case, bay, connector, etc. as discussed in more detail above, which physically allows or disallows connection of the peripheral.

In either these physical embodiments, or the electronic key embodiments illustrated in FIGS. 7 and 7a, connection of compatible devices is facilitated, while connection of incompatible devices is disallowed. In this way the power supply of the printer can be protected, as can be non-compatible peripheral devices which otherwise might be damaged by erroneous connection to the module/printer. Also, the key allows convenient bundling of related compatible products by a manufacturer, while discouraging connection of other manufacturer's products. This can give an advantage in the marketplace by enabling a manufacturer to have a measure of control over the quality of the performance of the printer and connected devices. It can also give a measure of confidence that the connected devices will be compatible, and that the system will perform reliably and as expected.

With reference now to FIGS. 9–15, a number of further different example configurations for implementation of a PPPN are illustrated. These few examples are given to illustrate further features and details of application of the invention in various embodiments.

Figure 9:
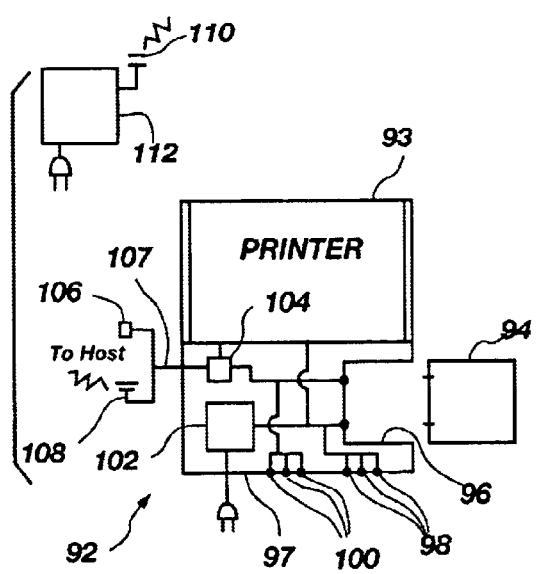
FIG. 9 is a schematic block diagram illustrating a P/PPN system according to an embodiment of the invention.

As shown in FIG. 9, the PPPN 92 can be incorporated with a printer 93, and can accommodate connection of one or more additional peripherals 94. This can be by means of one or more bays 96, or otherwise accommodating the peripheral(s) in a case 97 of the printer. Also, as discussed, power connections 98 and data connections 100, can be provided to accommodate connection of the additional peripheral(s) 94; and, also, of one or more other peripherals (not shown) at the location of the printer powered peripheral node 92 without incorporating them within the case. As will be appreciated, a power supply 102, and a data communication logic/processor 104, if required, to enable data connection of the one or more connected peripherals 94, are provided within a case in this embodiment. The case can be configured with additional bays, and sized so as to be as large as required to accommodate additional peripherals (not shown) if it is desired that they be provided at the PPPN.

As discussed above, the connection to the host whether a PC or a network can be wired 106 or wireless 108. In one embodiment the PPPN 92 can also include a wireless connection 110 to a stand-alone peripheral 112, this allows a peripheral (or several) to be connected at the PPPN, but without necessarily being immediately physically proximate the PPPN and not being cable-connected to the PPPN. As will be appreciated, if not physically proximate, the additional peripheral 112 can have its own power supply. An example of this later configuration is where a the peripheral connected wirelessly to the PPPN is a at one side of a room, whereas the PPPN with other peripherals is at another side of the room, or even in an another room, or on another floor, where cable connection would be inconvenient.

Figure 10:
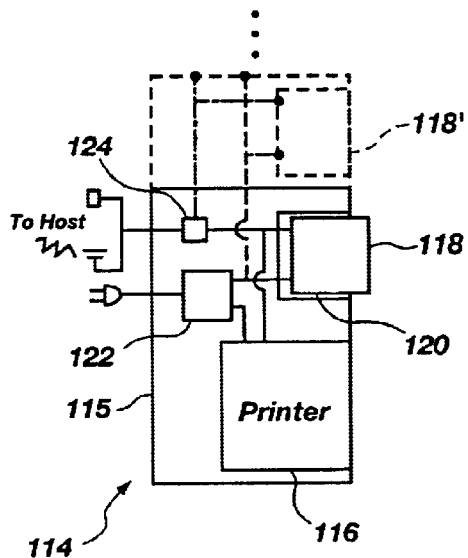
FIG. 10 is a schematic block diagram illustrating a P/PPN system according to an embodiment of the invention.

With reference now specifically to FIG. 10, in another embodiment the PPPN 114 can be embodied within a case 115 with a peripheral device, such as a printer 116 in the illustrated embodiment. In this example the printer/PPN can accommodate one or more additional peripheral devices 118, 118'; by incorporation in the case, or by providing a bay 120 allowing the peripheral to be inserted, and also to be conveniently swapped out as discussed above. Again a power supply 122, and data connection logic 124 are provided to facilitate implementation of the powered peripheral node.

Examples of implementation of the embodiment of FIGS. 9 and 10 were discussed above in connection with FIGS. 6 and 6A, where the bay(s) 96, 120 were implemented using an auxiliary paper tray 62. Another embodiment was discussed above in connection with FIG. 3, where a swappable peripheral device 32 is accommodated in a bay 36 in a printer case portion or attached module 28.

Figure 11:
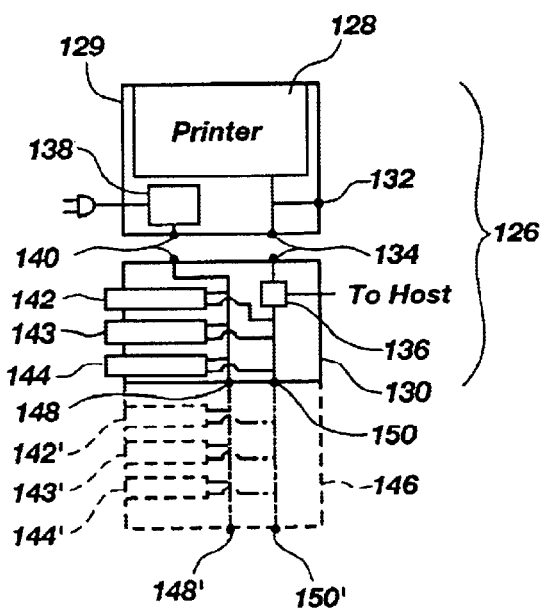
FIG. 11 is a schematic block diagram illustrating a P/PPN system according to an embodiment of the invention.

In another embodiment illustrated by FIG. 11, the printer/PPN 126 is realized when a printer 128 in a printer case 129 is joined with a peripheral module case 130. In this embodiment the printer has, in addition to a standard data connection 132 (in accordance with a standard protocol), a data connection 134 that is made when the cases are joined, connecting the printer to a data bus and/or network data connection logic 136 of the PPPN 126. Likewise the power supply 138 of the printer is incorporated in the PPPN by means of another connection 140 made when the cases are joined. One or more accommodated peripheral devices 142, 143, 144 can be thus powered and data-connected. Moreover, by expansion of the case 130, or by attachment of one or more additional case module(s) 146 including additional power and data connections 148, 150 respectively (and 148', 150' for additional module(s)) connection of one or more further peripheral(s) 142', 143', 144' is enabled.

Figure 12:
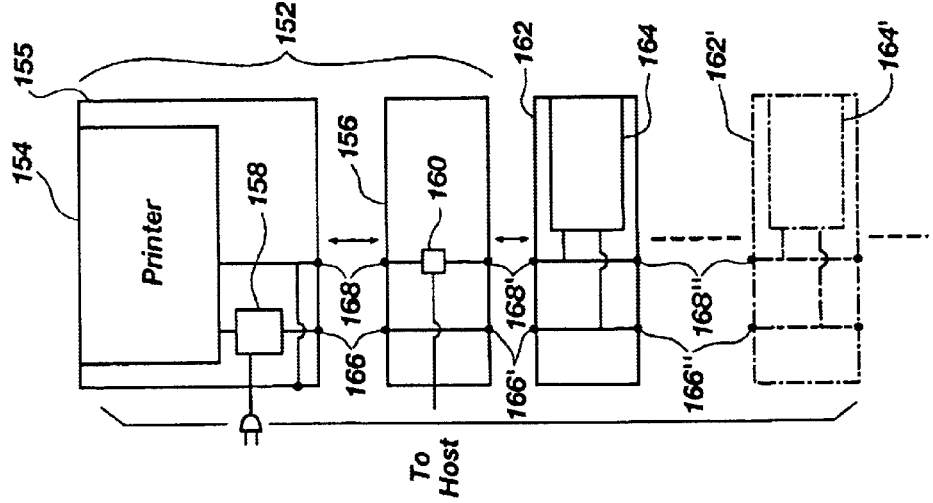
FIG. 12 is a schematic block diagram illustrating a P/PPN system according to an embodiment of the invention.

With reference now to FIG. 12, in another embodiment the above-described functionality is implemented in a modular way by a PPPN 152 comprising a printer 154 in a printer case 155, which is connectable to a PPPN module 156. A power supply 158 and data bus and/or network connection 160 are thereby made available to one or more connectable modules 162, 162', etc., each containing a peripheral device 164, 164', etc. Connectors for power and data 166, 168, respectively are provided as discussed above. An example of the modular concept of this embodiment is also discussed above in connection with FIGS. 1–5.

Figure 14:
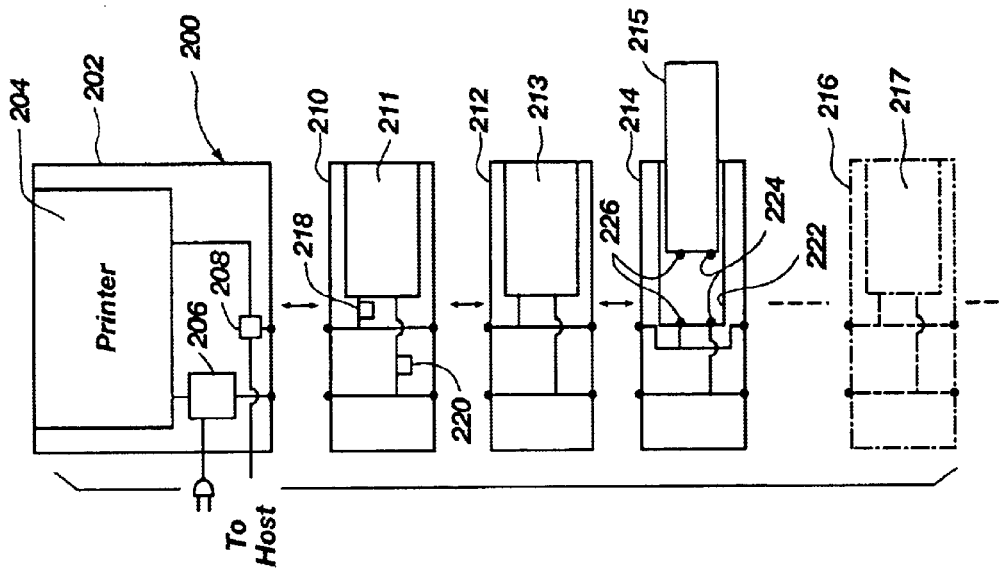
FIG. 14 is a schematic block diagram illustrating a P/PPN system according to an embodiment of the invention.
Figure 13:
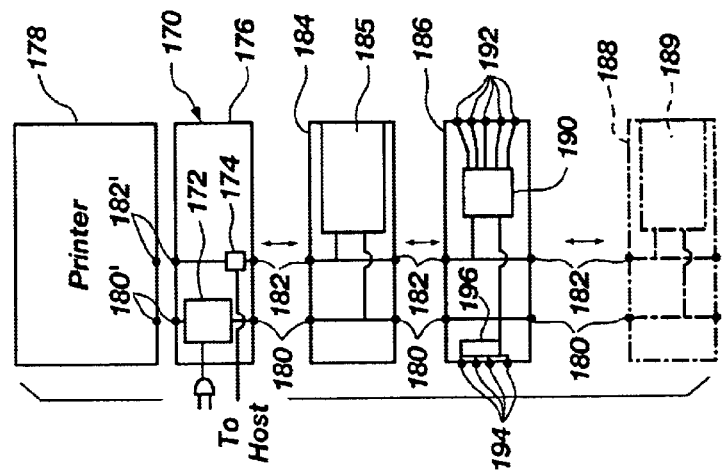
FIG. 13 is a schematic block diagram illustrating a P/PPN system according to an embodiment of the invention.

Other examples of the modular implementation enabled by the invention are shown in FIGS. 13 and 14. With particular reference to FIG. 13, a PPPN module 170 comprises a power supply 172 and data bus and/or network data connection logic hardware 174 to enable connection to a PC or a network (not shown), all incorporated in a case 176. The case is connectable to a printer 178 and number of peripheral device modules 184, 186, 188, etc. In one embodiment, the printer and the PPPN module can be bundled together when sold to a customer, but if a component of either fails, only one need be replaced. This is a difference from the embodiment discussed above in connection with FIG. 12; for in that example the printer 154 in its case 155 would be joined with the PPPN module 156 to collectively form the PPPN, as the PPPN uses the power supply within the printer case. In the embodiment illustrated in FIG. 13, the PPPN module 170 functions independently of the printer 178. The power supply 172 used by the printer is within the PPPN case 176, and the printer cannot function independent of the PPPN module. The Printer in the embodiment illustrated in FIG. 12 will function alone.

Power and data bus connections are made as the modules are connected together as discussed above. This can be by means of contacts, connectors, and other means known in the art. As an example, in one embodiment connectors 180, 182 for power and data can be provided at a uniform location on modules 184, 186, 188, though the modules can each incorporate the same or different peripheral devices as those connected adjacent, so that the modules can be attached in different orders, with few or many modules being connected, as they can be standardized. Likewise the printer 178 is connected by connections 180', 182' for power and data communication, respectively. For example, the first module 184 can incorporate one of a number of devices, such as media data storage and retrieval devices, hard drives, powered data hubs of different protocols, scanners or other image capture devices, etc.

In the illustrated embodiment the second one of the modules, 186, embodies a hub 190, such as a USB or FireWire Hub which may embody further logic, or not, depending on whether it uses a different protocol than the data bus otherwise provided by the PPPN network connection 174. Hub connectors 192 enable a plurality of further devices to be data-connected. In one embodiment power connectors 194 can also be provided. If a power supply 196 providing power at different voltages, waveforms, etc. is provided different connectors having different supply voltages can be provided. A third module 188 to be connected can contain an entirely different peripheral device 189. Additional modules (not shown) can be added, as is the case with each of the illustrated modular embodiments discussed herein.

Turning now to FIG. 14, in another embodiment the PPPN 200 in one embodiment can be incorporated in the same case 202 as a printer 204, and share a common power supply 206. A data bus and/or network connection is enabled by data connection hardware 208 provided. This also enables data connection of one or a number of modules 210, 212, 214, and one or more others 216 to be connected. In the illustrated embodiment a data bus using a standardized protocol can be provided. Further, a module 210 containing a peripheral 211 using a different protocol or a different supply voltage can incorporate data translation logic hardware 218 and a further power supply 220 to convert the data and power signals passing therethrough, to provide compatibility with the standardized data and power-signals of the modular approach used in these examples. Again, in this example, the incorporated peripheral devices 213, 215, 217 in other modules connected, or to be connected, can be any of a number of peripheral devices. The particular peripherals being a matter of choice depending on what users want at the printer PPN provided at a particular location. With a modular approach, customization by the customer is conveniently facilitated.

In the illustrated example shown in FIG. 14, one of the modules, 214, can incorporate a bay 222 further incorporating connectors 224, 226 for power and data communication, respectively, with the peripheral 215 insertable therein. This module adds further flexibility, as peripherals can be changed in and out of that module. In one example, the bay module can enable connection of a peripheral not otherwise available prepackaged in a module 210, 212, 216, etc.; or in another example, can enable a swappable peripheral to be used.

Otherwise this embodiment is similar to those previously discussed. This embodiment does have the advantage of being a network-enabled printer 204, even if no modules 210, 212, 214, 216 etc. are connected.

As will be appreciated with reference to all the figures and the foregoing discussion, the printer powered peripheral node in accordance with these embodiments allows convenient connection of one or more peripherals at a printer location for use by a connected PC or users on a network to which the printer/PPN is connected.

In a network environment this can be done without the need for a PC at the connection node of a network, and the PPPN can be a cost-effective alternative to providing such peripherals as zip drives 25, floppy drives 23, CDRW/DVD drives 24, large capacity hard drives 60 and raid arrays, additional data bus connection hubs 40, 42, etc. at more than one client-node workstation PC as they can be shared at a commonly-used printer/PPN. Significant savings are possible through reducing the cost of each workstation PC by sharing such peripherals. Moreover, convenient access to the devices without disturbing the work of a user at a PC (not shown) where a shared peripheral is located is avoided. The space savings made possible, with associated overhead cost, can also be considerable in some circumstances.

In embodiments where the PPPN is connected to a single PC, it can provide for convenient connections of additional peripheral devices. Further, it can provide for connection of additional peripherals when the slots/bays of the PC are full, without significantly reducing available desk space due to additional devices, cables, etc. being provided individually.

In this connection, with respect to both PC- and the network-connected embodiments, the provision of the connected peripherals can be done with minimal increase in space requirements. As discussed, this is because the footprint and cabling provided for the printer is leveraged in providing the PPPN.

These examples demonstrate that the invention can provide a convenient, and lower-cost, solution to providing additional peripheral devices. Convenient use, convenient bundling for sale, and convenient re-configuration and replacement of peripherals in connection with a printer is facilitated. For at least these reasons, time and cost savings can be realized over solutions conventionally used for adding peripherals, and for providing shared peripherals by implementation of the PPPN in a stand-alone PC or network environment.

It will be apparent that in addition to the particular examples set forth, other variations and modifications can be implemented within the scope of the invention. Persons skilled in the art, once seeing the examples disclosed, and appreciating the salient principles of the invention, will be able to make numerous changes and modifications which time will not permit to be set forth herein. Therefore these above-set-forth examples will be understood to be provided to help explain and illustrate features and advantages of the invention, and may also enable those skilled in the art to employ various alternatives to the specific examples. However, these specific examples of implementation are not to be construed as limiting of the scope of the invention.

What is claimed is:

1. A printer/powered peripheral node (P/PPN) system, comprising:
    a housing configured to house a printer and at least one additional peripheral device; and,
    a powered peripheral node (PPN), further comprising:
        a data connection enabling data communication with the printer and a plurality of additional peripheral device; and,
        a power supply configured to provide power to the printer and the plurality of additional peripheral device;
    whereby, the plurality of additional peripheral device can be located at a location of the printer and share the power supply and the data connection with the printer.

2. A printer/powered peripheral node module as in claim 1, further comprising a bay carried by the housing, the bay configured to receive the at least one additional a peripheral device.

3. A printer/powered peripheral node system as in claim 1, wherein the housing comprises a plurality of housing portions, a first portion of which is configured to enclose at least the printer, and a second portion of which is configured to enclose at least one additional peripheral device, said peripheral module portion being configured to attach to the printer housing portion.

4. A printer/powered peripheral node system as in claim 3, wherein the peripheral module portion is configured to attach to a bottom side of the printer housing portion, and reside underneath the printer.

5. A printer/powered peripheral node system as m claim 3, wherein the peripheral module portion is configured to attach to the printer housing portion by replacing an auxiliary paper tray of the printer.

6. A printer/powered peripheral node system as in claim 5, further comprising at least one connector configured for making power and data communication connections between the peripheral module portion and the printer housing portion when the module is inserted into an auxiliary paper tray slot.

7. A printer/powered peripheral node system as in claim 3, wherein the peripheral module portion is configured to be connectable to another attachable module portion that includes power and data connections to the printer; whereby a plurality of the peripheral module portions can be attached to the printer housing portion.

8. A printer/powered peripheral node system as in claim 7, wherein each of the peripheral module portions is configured to carry at least one peripheral device, whereby a plurality of the peripheral devices can be added and deleted from connection to the printer housing portion by adding and deleting the peripheral module portions.

9. A printer/powered peripheral node system as in claim 2, wherein the bay is configured to slidably receive a swappable peripheral device, and further comprising power and data connections configured to make data and power connections to the swappable peripheral device when it is inserted into the bay.

10. A printer/powered peripheral node system as in claim 1, further comprising a wireless data connection device, whereby the P/PPN can data communicate wirelessly with a remote device.

11. A printer/powered peripheral node system as in claim 1, further comprising a key which can allow or not allow connection of the additional peripheral device.

12. A printer/powered peripheral node system as in claim 11, wherein the key comprises one of a physical key and an electronic key.

13. A printer/powered peripheral node system, comprising:
    a printer configured to be connectable to at least one attachable module, the attachable module being configured to carry a peripheral device;
    a shared data bus connection facilitating data communication with the printer and said at least one peripheral device via the connection; and
    a shared power connection facilitating supply of power to the printer and to said at least one peripheral device carried by the module; and,
    wherein at least one attachable module is configured to carry a peripheral device other than an image capture device.

14. A printer/powered peripheral node system as in claim 13, the attachable module further comprising a bay configured to receive the peripheral device.

15. A printer/powered peripheral node system as in claim 13, wherein the system is configured such that the attachable module can attach to a side of the printer.

16. A printer/powered peripheral node system as in claim 15, wherein the attachable module is configured to attach to a bottom side of, and reside underneath, the printer.

17. A printer/powered peripheral node system as in claim 13, wherein the attachable module is configured to attach to the printer by replacing an auxiliary paper tray of the printer.

18. A printer/powered peripheral node system as in claim 17, further comprising connectors configured for making power and data signal connections when the attachable module is inserted in an auxiliary paper tray slot.

19. A printer/powered peripheral node system as in claim 13, wherein the attachable module is configured to be connectable to another attachable module, and further comprises power and data connections whereby a plurality of the attachable modules can be attached to the printer.

20. A printer/powered peripheral node system as in claim 19, wherein each of the attachable modules is configured to carry at least one of the peripheral devices, whereby the peripheral devices can be added to and deleted from connection to the printer by adding and deleting the attachable modules.

21. A printer/powered peripheral node module system as in claim 13, wherein the attachable module is configured to slidably receive a swappable peripheral device, and further comprising power and data connections configured to connect the swappable peripheral device when it is inserted into the attachable module.

22. A printer/powered peripheral node system, comprising
    a printer configured to be connectable to a plurality of peripheral devices so that each of said peripheral devices reside within a housing which is one of: a) attached to, and b) enclosing, the printer;
    a data bus connection configured to facilitate data communication with the printer and with each of said peripheral devices;
    a power connection configured to facilitate power supply to the printer and to said plurality of peripheral devices; and
    a key configured to facilitate connection of compatible devices and de-facilitate connection of incompatible devices.

23. A printer/powered peripheral node system as in claim 22, wherein the power supply is housed with the printer and is configured to provide power to the printer and to said plurality of peripheral devices.

24. A printer powered peripheral node system as in claim 22, wherein the key is physical and comprises a physical compatibility including at least one of: electrical connector shape, housing connector shape, housing shape, electrical connector location, and housing connector location.

25. A printer/powered peripheral node system as in claim 22, wherein the key comprises an electronic key.

26. A printer/powered peripheral node system as in claim 25, wherein the electronic key comprises at least one of an electronic identification code, a power supply compatibility, a communications protocol compatibility, an identification signal, a software negotiation, a firmware recognition routine, a hardware recognition system, a circuit that enables a determination of whether a connection is one of: a) an allowed; and, b) a disallowed connection, based on a predetermined criteria.

27. A method enabling provision of at least one additional peripheral device other than an image capture device at a printer location, comprising:

providing and configuring a power supply to provide power to the printer and the at least one additional peripheral device;

providing and configuring a data connection to enable data communication with the printer and the at least one additional peripheral device;

providing at least one housing enabling the printer and the at least one additional peripheral device to be carried within a common housing footprint, whereby a printer/powered peripheral node can be created enabling at least one additional peripheral device other than an image capture device to be so carried at a printer location.

28. A method as set forth in claim 27, further comprising a wireless data connection between the printer location, and one of a) another device; b) a PC; c) a server; and, d) a network.

29. A printer/powered peripheral node system, comprising:

a printer configured to be connectable to a peripheral device so that said peripheral device resides within a housing which is one of: a) attached to, and b) enclosing, the printer;

a data bus connection configured to facilitate data communication to and from the printer and to and from said peripheral device and one of: a) a PC, b) a server, and, c) a network;

a power connection configured to facilitate power supply to the printer and to said peripheral device;

an electronic key configured to facilitate connection of compatible devices and de-facilitate connection of incompatible devices, wherein the electronic key comprises at least one of an electronic identification code, a power supply compatibility, a communications protocol compatibility, an identification signal, a software negotiation, a firmware recognition routine, a hardware recognition system, a circuit that enables a determination of whether a connection is one of: a) an allowed; and, b) a disallowed connection, based on a predetermined criteria.

30. A printer and housing including a powered peripheral node, comprising;

a housing configured for carrying the printer and powered peripheral node;

a power supply carried by the housing, configured to provide power to the printer, and in addition to the printer, at least one of a plurality of peripheral devices different from each other;

a data connection carried by the housing, configured to facilitate connection to and provide data communication to at least one of a plurality of peripheral devices different from each other;

a power connection carried by the housing, configured to facilitate connection to and powering of at least one of a plurality of peripheral devices different from each other;

the printer and powered peripheral node being configured so that at least one of a plurality of peripheral devices different from each other is connectable and locatable at the location of the printer, whereby a node for connecting any one or more of said plurality of peripheral devices is created allowing a consumer to choose a peripheral device and printer combination to be located at a location of the printer.

31. A printer and housing including a powered peripheral node as set forth in claim 30, further comprising a bay carried by the housing, the bay configured to receive at least one additional a peripheral device.

32. A printer/powered peripheral node system as in claim 31, wherein the bay is configured to slidably receive a swappable peripheral device, and further comprising power and data connections configured to make data and power connections to the swappable peripheral device when it is inserted into the bay.

33. A printer and housing including a powered peripheral node as set forth in claim 30, wherein the housing comprises a plurality of housing portions, a first portion of which is configured to enclose at least the printer, and a second portion of which is configured to enclose at least one additional peripheral device, said peripheral module portion being configured to attach to the printer housing portion.

34. A printer and housing including a powered peripheral node as set forth in claim 33, wherein the peripheral module portion is configured to attach to the printer housing portion by replacing an auxiliary paper tray of the printer.

35. A printer and housing including a powered peripheral node as set forth in claim 30, wherein the peripheral module portion is configured to be connectable to another attachable module portion that includes power and data connections to the printer; whereby a plurality of the peripheral module portions can be attached to the printer housing portion.

36. A printer/powered peripheral node system as in claim 35, wherein each of the peripheral module portions is configured to carry at least one peripheral device, whereby a plurality of the peripheral devices can be added and deleted from connection to the printer housing portion by adding and deleting the peripheral module portions.

37. A printer/powered peripheral node (P/PPN) system as in claim 30, further comprising a wireless data connection device, whereby the P/PPN can data communicate wirelessly with a remote device.

38. A printer/powered peripheral node system as in claim 30, further comprising a key which can allow and not allow connection of the additional peripheral device.

39. A printer/powered peripheral node system as in claim 38, wherein the key comprises one of a physical key and an electronic key.

* * * * *